Feb. 28, 1956 J. J. MALOOF 2,736,041
PORTABLE PENS FOR CONFINING BABIES AND SMALL CHILDREN
Filed July 21, 1950 3 Sheets-Sheet 2
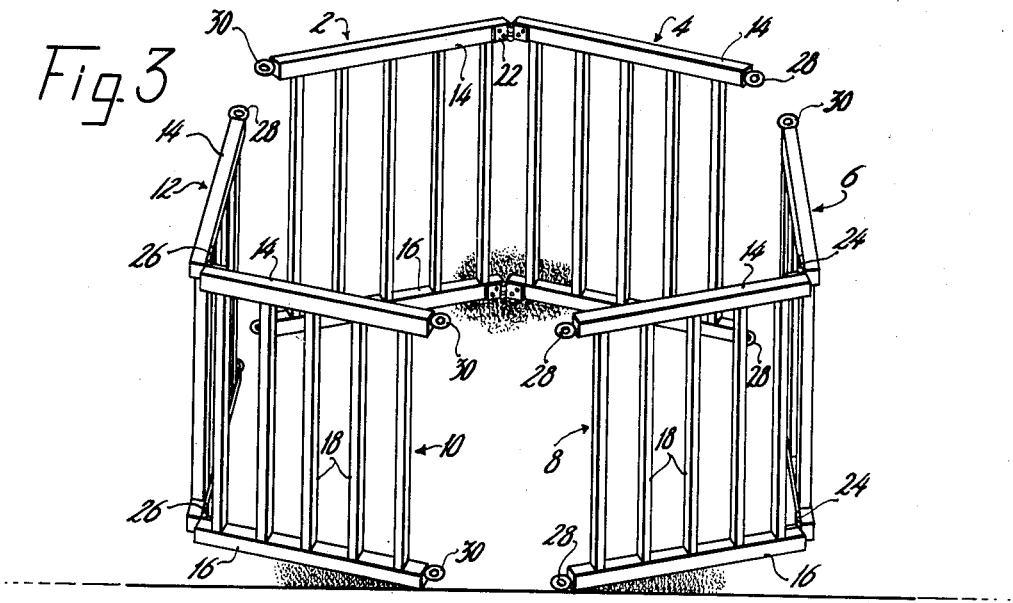
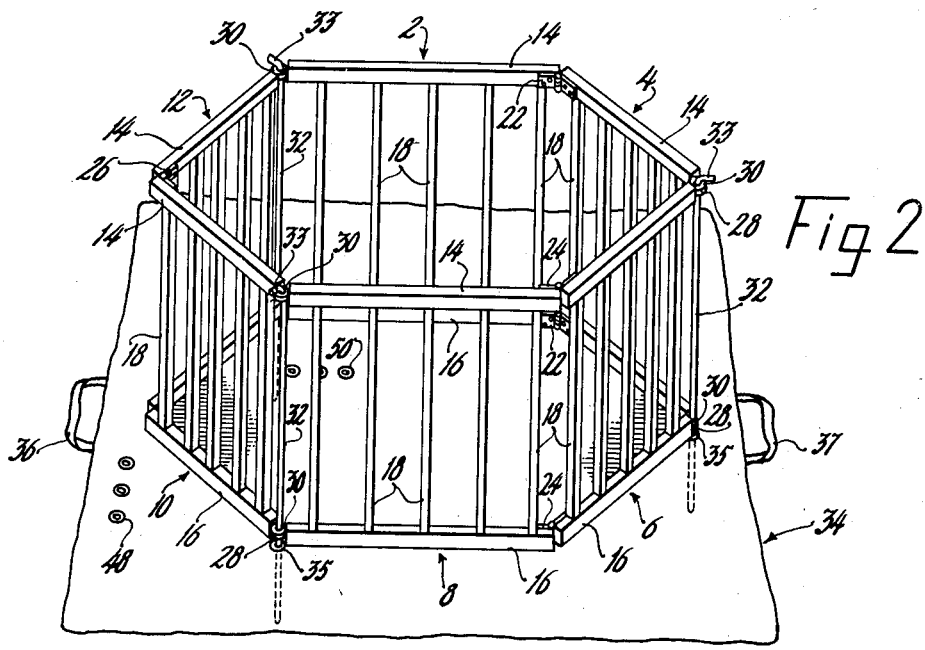
INVENTOR.
John J. Maloof
BY
Chauncey M. Sincerbeaux
ATTORNEY Feb. 28, 1956 J. J. MALOOF 2,736,041
PORTABLE PENS FOR CONFINING BABIES AND SMALL CHILDREN
Filed July 21, 1950 3 Sheets-Sheet 3
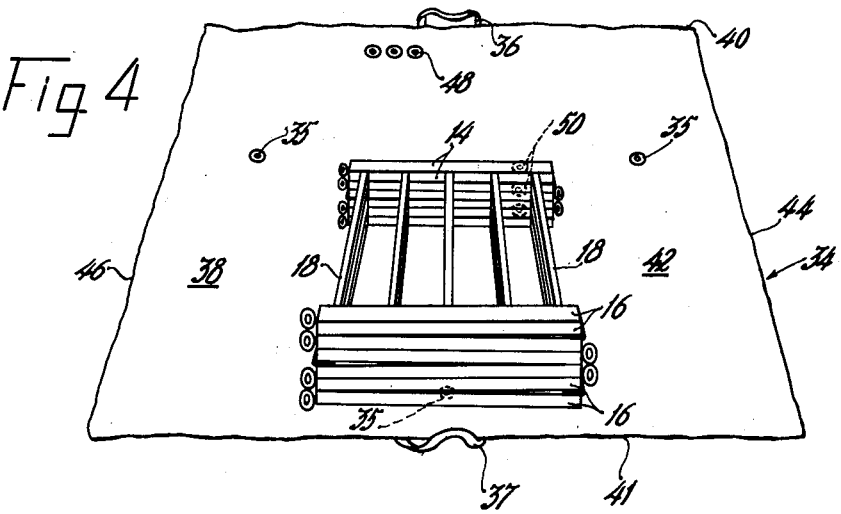
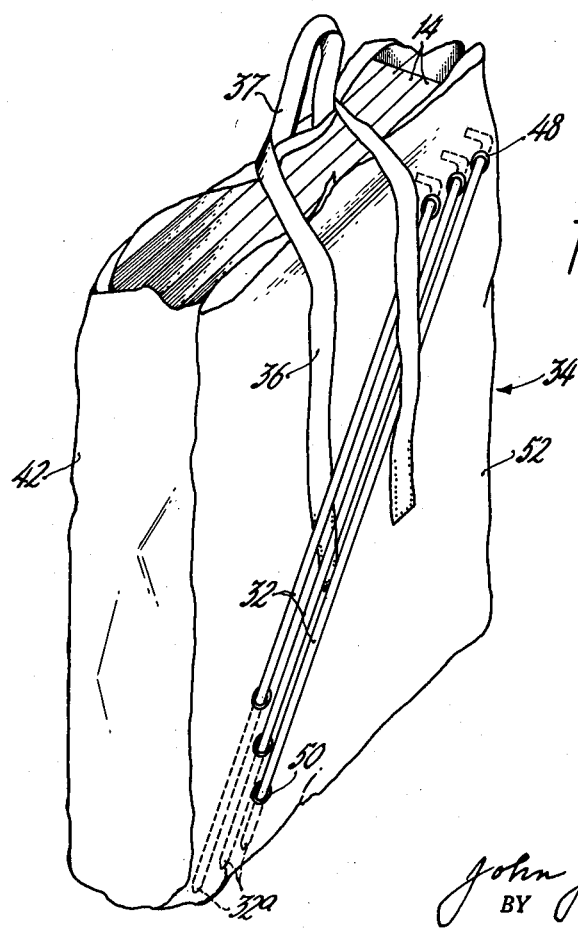
INVENTOR.
John J. Maloof
BY
Chauncey N. Sincerbeaux
ATTORNEY

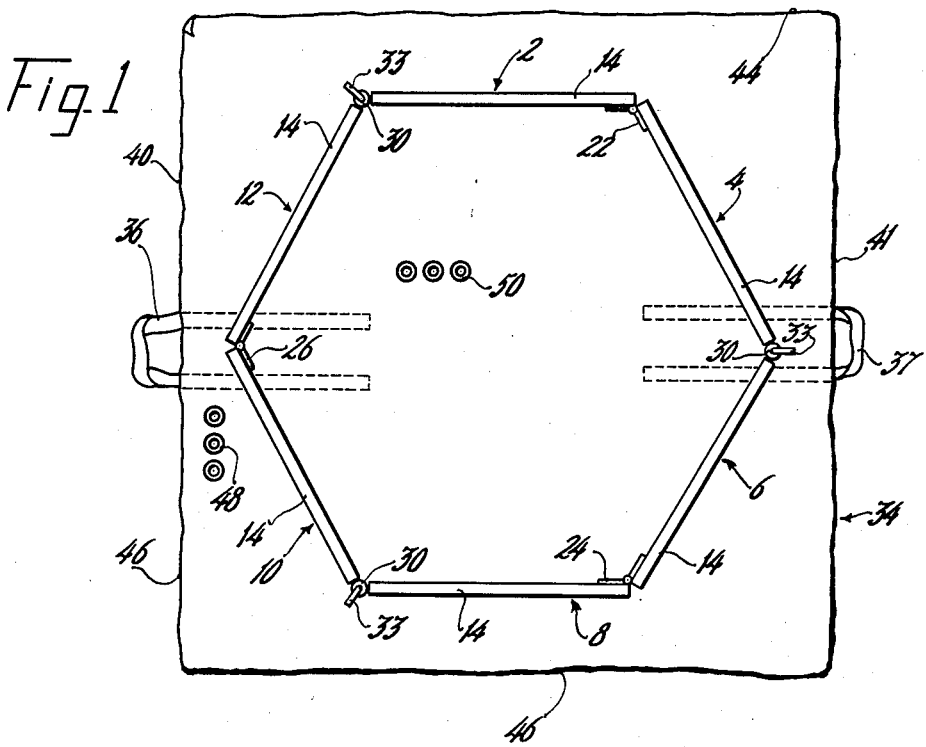
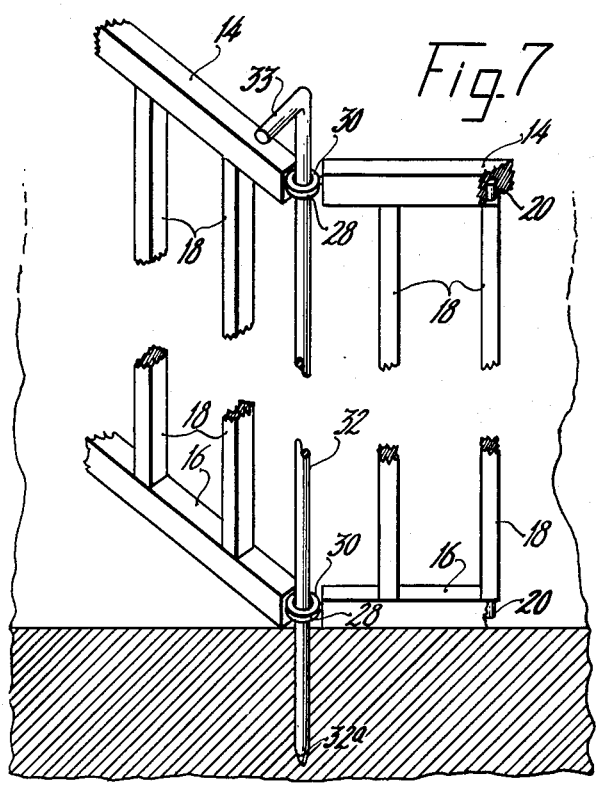
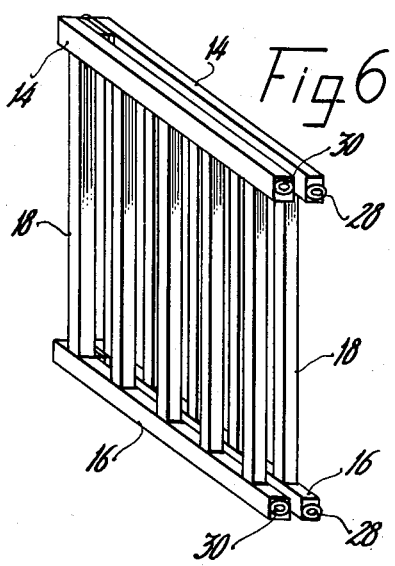

United States Patent Office 2,736,041
Patented Feb. 28, 1956

2,736,041

PORTABLE PENS FOR CONFINING BABIES AND SMALL CHILDREN

John J. Maloof, East Hartford, Conn.

Application July 21, 1950, Serial No. 175,182

1 Claim. (Cl. 5—99)

The invention relates to portable enclosures or pens for confining babies and small children so that they may be maintained under relatively close observation and care.

Certain important objects of the invention are to improve the construction and mode of operation of enclosures or pens of this character and to produce an enclosure which is simple in construction and inexpensive to manufacture as compared with prior enclosures and which, after being in use, may be readily reduced to a condition such that it may be packed in a relatively small space and may be easily carried.

Another object of the invention is to produce an enclosure for holding babies and small children which, after having been in operation, may be readily separated into novel units or parts which are relatively light in weight, occupy relatively small space and may be conveniently handled in packing the same up for transportation and in unpacking and setting up the enclosure.

With the above and other objects in view, the invention consists in an enclosure or pen embodying the novel and improved features, constructions and combinations of parts hereinafter described and particularly pointed out in the claims, the advantages of which will be readily understood and appreciated by those skilled in the art.

The invention will be clearly understood from the accompanying drawings illustrating a pen or enclosure construction embodying the invention in its preferred form and the following detailed description of the constructions therein shown.

In the drawings, Fig. 1 is a plan view illustrating an enclosure or pen embodying the invention.

Fig. 2 is a perspective view of the construction shown in Fig. 1.

Fig. 3 is a perspective view illustrating the pairs of sections of the enclosure set up upon the ground or other supporting surface in positions to be brought together and connected.

Fig. 4 is a perspective view illustrating the several pairs of sections folded together, placed in superposed relation and laid upon the bottom or floor mat in position to have said mat folded about the same.

Fig. 5 is a perspective view illustrating the several pairs of sections assembled as in Fig. 4 and the bottom mat folded about the same to form a readily portable package.

Fig. 6 is a detail perspective view illustrating one of pairs of sections in folded together condition, and Fig. 7 is a detail perspective view illustrating the construction by which two sections are detachably connected together.

In the illustrated form of the invention, the pen or enclosure comprises a series of sections or panels hinged together in pairs so that the sections of each pair may be folded into side by side relation to form a plurality of light, compact, easily handled units. These units are constructed and arranged to be packed in superposed relation so as to occupy relatively small space.

The pen illustrated is intended to form a six sided enclosure but, when less than the full number of sections are used, a four sided enclosure may be produced. The pen comprises the sections or panels 2, 4, 6, 8, 10 and 12. Each of these sections is provided with spaced bars 14 and 16 arranged to form the upper and lower rails of the section and spaced crossbars 18 connecting the bars 14 and 16, the bars 18 each preferably having dowels 20 formed respectively at the ends thereof for insertion in holes bored in the rails to receive the same.

The crossbars 18 are located sufficiently close together to prevent a baby from passing between the same.

As above indicated, the panels are hinged together in pairs for easy and convenient handling in setting up and taking down the pen. In the construction shown, the panels 2 and 4 are permanently hinged together in end-to-end relation by means of hinges 22 secured to corresponding lateral faces of the bars adjacent the ends of the bars as shown clearly in Figs. 1, 2 and 3. In a similar manner, the panels 6 and 8 are permanently hinged together in end-to-end relation by means of hinges 24 and the panels 10 and 12 are permanently hinged together in end-to-end relation by means of hinges 26. By these hinges, the panels of each pair are pivoted together for relative swinging movement in one direction about an axis substantially parallel with the general plane of each panel and parallel with the crossbars 18. This enables the panels of each pair to be folded together into side by side relation as shown in Fig. 6.

In setting up an enclosure with the pairs of hingedly connected panels, to form a six sided enclosure, preferably the pairs of panels are set up on the ground or other supporting surface as shown in Fig. 3 with the panels of each pair extending at an obtuse angle to each other. The free end of each panel of each pair is then connected to the adjacent free end of one of the panels of each adjoining pair. The connecting means for connecting the adjacent free ends of the panels of adjoining pairs is constructed and arranged so that the panels may be quickly and easily connected in setting up the enclosure and that said panels may be just as quickly and easily disconnected in taking down or collapsing the enclosure.

In the construction shown, the mechanism for disconnectibly connecting the free ends of the panels or sections of each pair with the free ends of the panels or sections of adjoining pairs comprises eye members 28 mounted on the free ends of the upper and lower rails of the panels 4, 8 and 12 and eye members 30 mounted upon the free ends of the upper and lower rails of the panels 6, 10 and 2. The eye members 28 on the panels 4, 8 and 12 are arranged to be located in registration with the eye members 30 on the panels 6, 10 and 2 when the free ends of the panels on adjoining pairs are placed in juxtaposition as shown in Figs. 1, 2 and 7. These eye members preferably consist of screw eyes threaded endwise into the ends of the upper and lower rails of the several panels. The screw eyes are preferably located on the rails so that, when the hinged pairs of panels are located as shown in Fig. 3 with the panels in substantially vertical position and resting on a horizontal support, the screw eyes 30 will be located at a height slightly greater than the screw eyes 28, the difference in the heights of the two sets of screw eyes being at least equal to the thickness of the screw eyes. This enables the adjoining panels of two pairs to be located in the relative positions shown in Figs. 1, 2 and 7 with the ends of the rails 14 and 16 in closely adjacent positions and with the screw eyes 28 and 30 in registration.

The mechanism for disconnectibly connecting the free ends of the panels or sections of each pair with the free ends of the panels or sections of adjoining pairs comprises a plurality of connecting rods 32. Each of these rods is preferably sharpened at one end as indicated at 32a and the other end is formed with a portion 33 bent at a substantially right angle to the body of the rod.

To disconnectibly connect the panels of each pair with the adjoining panels of the two other pairs, the panels having been located substantially in the relative positions shown in Figs. 1, 2 and 7 with the screw eyes 30 on one of the panels of each pair in registration with the screw eyes 28 on the adjoining panel of another pair, a rod 32 is passed downwardly through each of the three sets of registering screw eyes 28—30 as shown in Figs. 1, 2 and 7.

Thus, as above indicated, in setting up the baby pen or enclosure upon the ground or other supporting surface, as preferably performed, the several panels hinged together in pairs are first placed upright on said surface in substantially the positions shown in Fig. 3, so that the panels form a substantially hexagonal enclosure except that the free ends of the sections of each pair are not joined to the free ends of the adjoining sections. As will be noted from this figure, the sections of the device are located on said surface so that the two sections of each pair extend at an obtuse angle to each other and that the hinges between the sections are located inside the angle. The adjoining free ends of the several sections are then brought together to locate the screw eyes on the free end of each of the sections 2, 6 and 10 in registration with the screw eyes on the free end of each of the sections 4, 8 and 12. The rods 72 are then inserted through the three sets of registering screw eyes to connect detachably the pairs of sections to form a hexagonal enclosure. If the pen is set up on the ground, the rods 32 may be forced into the ground as shown in Figs. 2 and 7 to anchor the pen to the ground.

The pen or enclosure is preferably provided with a mat such as that indicated at 34 forming a base upon which the pen is set up. The mat preferably consists of a predetermined yardage or area of woven fabric preferably of the type known in the art as canvas, treated with waterproofing material. This mat is laid on the ground or other supporting surface and the pen is set up in a predetermined position on the mat. In order to locate the pen with relation to the mat and to enable the pen and the mat to be secured together when the pin is set up on the ground, the mat is provided with the three eyeletted holes 35 to receive the lower ends of the rods 32 when the rods are thrust below the lower rails of the panels or sections.

Figures 1 and 2 show the pen or enclosure resting on the mat and the rods thrust down from the sections through the eyeletted holes 35 in the mat and into the ground. The rods thus anchor both the enclosure and the mat in place on the ground.

Instead of a mat of woven fabric, the pen may be provided with a relatively rigid base made of wood or any other suitable material. This base may consist of sections hinged together for relative folding or detachably connected. Such a base is preferably provided with holes or sockets to receive the lower ends of the rods 32.

The mat 34 may be used when the pen is set up inside the house and will protect the carpets or flooring from becoming soiled or damaged. In this case, the rods 32 preferably are made shorter than those illustrated so that they will not extend below the mat when the rods are projected downwardly to their limiting positions.

The mat 32 is constructed to serve as a carrying case or cover when the pen is taken down or collapsed and the pairs of sections are packed together for transportation.

Figures 1 and 2 show the pen or enclosure set up for use upon a mat 34. As shown in this figure and in Fig. 4, the mat is provided with handle straps 36 and 37 secured to the lower side of the mat and having loops which extend beyond the edges 40 and 41 of the mat. These straps may be made of folded strips of canvas stitched or otherwise secured to the mat. In taking down or collapsing the pen, and packing the same, the rods 32, after disengaging the lower ends thereof from the ground if the pen is set up on the ground, are removed from the eyelets 35 and from the screw eyes 28 and 30 to disconnect the ends of the sections of each pair remote from the hinges from the corresponding ends of the sections adjacent thereto. This disconnects the pairs of sections. The sections of each pair are then folded together substantially into the relative positions shown in Fig. 6 except that the end portions of the rails 14 and 16 of the sections are brought into contact. The folded pairs of sections are then superposed upon each other as shown in Fig. 4 and the superposed pairs are placed upon the mat 34 substantially in the position shown in Fig. 4. As shown in this figure, the superposed pairs of sections are located substantially centrally of the mat between the edges 44 and 46 and adjacent the forward edge 41 with the rails on the sections extending substantially parallel with the edges 40 and 41 and the crossbars 18 extending substantially parallel with the edges 44 and 46.

The left hand strip of the mat extending along the left side of the superposed sections of the pen and indicated at 38 in Fig. 4 is then folded about and over the superposed pairs of sections of the pen, the fold extending to the rear edge 40 of the mat. The right hand strip of the mat extending along the right hand side of the superposed sections, and indicated at 42 in Fig. 4, is then folded about and over the superposed pairs of sections of the pen and in overlapping relation to the strip 38 of the mat, the fold extending to the rear edge 40 of the mat. The parts of the strips 38 and 42 of the mat between the superposed sections of the pen and the rear edge 40 of the mat and the portion of the mat underlying the same are then folded forwardly about the superposed pairs of sections and over the same above the parts of said strips overlying the superposed pairs of sections of the pen. Preferably the loop in the handle strap 37 is passed through the loop in the handle strap 36 and the pack of pairs of sections of the pen and the mat wrapped about the same in the manner described may be lifted into the position shown in Fig. 5 by means of the loop in the handle strap 37.

To enable the rods 32 readily to be packed for carrying in the mat 34, the mat is provided with two sets or series of eyeletted holes 48 and 50 arranged in the manner illustrated in Fig. 1, the holes in each series being located adjacent each other in equally spaced relation. As shown in this figure, the holes 48 of one of said series are located adjacent one leg of the strap handle 36 and extend in a line adjacent the edge 40 of the mat substantially parallel with said edge. The holes 50 of the other of said series are arranged in the central area of the mat and extend in a line substantially parallel with the edges 44 and 46. When the mat is folded about the pairs of sections of the pen in the manner described above, the holes 48 and 50 assume substantially the positions shown in Fig. 5. With the holes in these positions, the rods 32 are inserted therethrough in the manner shown in this figure. The left hand rod 32 shown in this figure, for example, is thrust through the left hand opening 48 from the inside of the portion 52 of the folded mat in which these openings are located and then is projected diagonally along the outside of the portion 52 of the folded mat. The lower end of the rod is then inserted through the uppermost of the openings 50 to the inside of the portion 52 of the mat and the rod is pushed down substantially to the position shown in Figure 5 in which the lower end of the rod engages the bottom of the casing formed by the folded mat. The angularly bent portion 33 of the rod is located in substantially the position shown in dotted lines in Fig. 5 inside the portion 52 of the folded mat. The other two rods 32 are inserted in a similar manner through the openings 48 and 50 and are finally located substantially in the positions shown in Fig. 5.

Each of the rods 32 not only connects detachably two of the panels or sections but the rod serves as a pivot about which said sections may be swung in opposite directions. This adds greatly to the flexibility of the enclosure and enables the same to be set up in widely varied shapes.

The baby pen above described has the advantage that, by using different numbers of pairs of sections or panels, pens of any desired size may be readily constructed. Thus, with two pairs of sections, a four sided pen may be produced, with these pairs of sections, a six sided pen such as that shown in this application may be produced, with four pairs of sections an eight sided pen may be produced and so on. In each case, the pen may be set up by first setting up the pairs of sections in a manner similar to that shown in Fig. 3 and then detachably connecting the free ends of the sections of each pair with the free ends of the adjoining sections by means of rods 32.

The baby pen or enclosure above described is relatively simple in construction and may be manufactured at considerably less expense than the enclosures heretofore constructed of which applicant is aware. The entire enclosure including the mat 34 is relatively light in weight and may be packed so as to occupy a relatively small space as will be evident from a consideration of Figs. 4 and 5. The pairs of sections pivotally connected together are relatively light and easy to handle and constitute an important feature particularly advantageous in the setting up of the enclosure and in the taking down and packing of the same.

It is to be understood that, except as defined in the claims, the invention is not limited to the particular construction and arrangement of parts of the illustrated embodiment of the invention but that the invention may be embodied in other forms within the scope of the claim.

Having explained the nature and object of the invention and having specifically described a construction embodying the invention in its preferred form, what is claimed is:

A portable pen for confining babies comprising a plurality of identical sections each comprising a pair of relatively stiff, self-sustaining panels of substantially identical shape and size, the two panels of each section being permanently hinged together at one end of each panel and being provided at their opposite ends with means for detachably pivotally connecting the section to a pair of adjacent sections, said means comprising upper and lower eyes outstanding in vertical register from the upper and lower portions respectively of each panel and a removable connecting rod extending through the registering eyes in the adjoining panels of each adjacent pair of sections, each connecting rod having a lower end portion adapted to extend below the sections into the ground or other support for the pen and having an upper end enlargement for limiting penetration of the rod through the upper registering eyes, and a floor mat comprising a sheet of flexible material having spaced positioning openings penetrated by said connecting rods.

References Cited in the file of this patent
UNITED STATES PATENTS

| | | |
|---|---|---|
| 338,349 | Johnstone | Mar. 23, 1886 |
| 402,334 | Lane | Apr. 30, 1889 |
| 485,081 | Baird | Oct. 25, 1892 |
| 804,581 | Carmichael | Nov. 14, 1905 |
| 907,204 | Walters | Dec. 22, 1908 |
| 946,629 | Williams | Jan. 18, 1910 |
| 1,252,824 | Melniker | Jan. 8, 1918 |
| 1,782,217 | Stoddard | Nov. 18, 1930 |
| 2,070,484 | Jones | Feb. 9, 1937 |
| 2,097,506 | Auty | Nov. 2, 1937 |
| 2,349,172 | Johnson | May 16, 1944 |
| 2,486,067 | Schroeder | Oct. 25, 1949 |
| 2,490,296 | Fournier | Dec. 6, 1949 |
| 2,581,318 | Bartlett | Jan. 1, 1952 |